United States Patent
Walters et al.

(10) Patent No.: US 12,104,690 B2
(45) Date of Patent: Oct. 1, 2024

(54) EPICYCLIC GEAR CARRIER ASSEMBLY HAVING AN INTEGRATED LUBRICATION PUMP

(71) Applicant: The Boeing Company, Chicago, IL (US)

(72) Inventors: John C. Walters, Glen Mills, PA (US); Mark J. Robuck, Chadds Ford, PA (US); Todd T. Harder, West Chester, PA (US); Eric A. Kaiser, Media, PA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/444,346

(22) Filed: Aug. 3, 2021

(65) Prior Publication Data
US 2023/0038989 A1  Feb. 9, 2023

(51) Int. Cl.
*F16H 57/04* (2010.01)
*F02C 7/06* (2006.01)
*F02C 7/36* (2006.01)

(52) U.S. Cl.
CPC ..... *F16H 57/0479* (2013.01); *F16H 57/0428* (2013.01); *F16H 57/043* (2013.01); *F16H 57/046* (2013.01); *F02C 7/06* (2013.01); *F02C 7/36* (2013.01); *F05D 2220/323* (2013.01);
(Continued)

(58) Field of Classification Search
CPC ............. F16H 57/0479; F16H 57/0428; F16H 57/043; F02C 7/36
See application file for complete search history.

(56) References Cited

U.S. PATENT DOCUMENTS

| | | | |
|---|---|---|---|
| 8,747,272 B2 * | 6/2014 | Imai | B64C 25/405 475/159 |
| 8,905,885 B2 * | 12/2014 | Yamamoto | B60K 6/26 184/6.12 |
| 9,810,158 B2 | 11/2017 | Foutch et al. | |

(Continued)

FOREIGN PATENT DOCUMENTS

DE  102006044725 A1  8/2007

OTHER PUBLICATIONS

United States Patent and Trademark Office, "Non-Final Office Action," issued in connection with U.S. Appl. No. 17/667,534, mailed on Sep. 20, 2023, 11 pages.
(Continued)

*Primary Examiner* — Derek D Knight
(74) *Attorney, Agent, or Firm* — Hanley, Flight & Zimmerman, LLC

(57) ABSTRACT

An example transmission comprising a lubricant feed passageway to receive lubricant; an input shaft having a cavity that defines a shaft collection trough to receive the lubricant from the lubricant feed passageway, the input shaft defining a radial passageway to enable the lubricant to flow from the shaft collection trough to an exterior surface of the input shaft; and a carrier to receive at least a portion of the input shaft, the carrier defining a carrier collection trough and channels formed in the carrier to distribute the lubricant to at least one of rotating components or non-rotating components in the carrier, the carrier collection trough to receive the lubricant from the shaft collection trough via the radial passageway in response to the input shaft rotating.

25 Claims, 11 Drawing Sheets

(52) U.S. Cl.
CPC ............... *F05D 2260/40311* (2013.01); *F05D 2260/98* (2013.01)

(56) References Cited

U.S. PATENT DOCUMENTS

| | | |
|---|---|---|
| 10,100,744 B2 | 10/2018 | Mackin et al. |
| 10,738,710 B2 | 8/2020 | Sidelkovskiy |
| 10,808,625 B2 * | 10/2020 | Yoshitomi ................. F02C 7/00 |
| 11,454,175 B2 | 9/2022 | Amari |
| 2019/0193524 A1 | 6/2019 | Stoltz |
| 2019/0383220 A1 | 12/2019 | Mackin |
| 2021/0189970 A1 * | 6/2021 | Morreale ............ F16H 57/0479 |
| 2022/0268198 A1 | 8/2022 | Hennessy et al. |
| 2022/0349410 A1 | 11/2022 | Robuck et al. |

OTHER PUBLICATIONS

United States Patent and Trademark Office, "Notice of Allowance and Fee(s) Due," issued in connection with U.S. Appl. No. 17/667,534, dated Dec. 26, 2023, 9 pages.

United States Patent and Trademark Office, "Notice of Allowance," issued in connection with U.S. Appl. No. 17/667,534, dated Feb. 16, 2024, 2 pages.

* cited by examiner

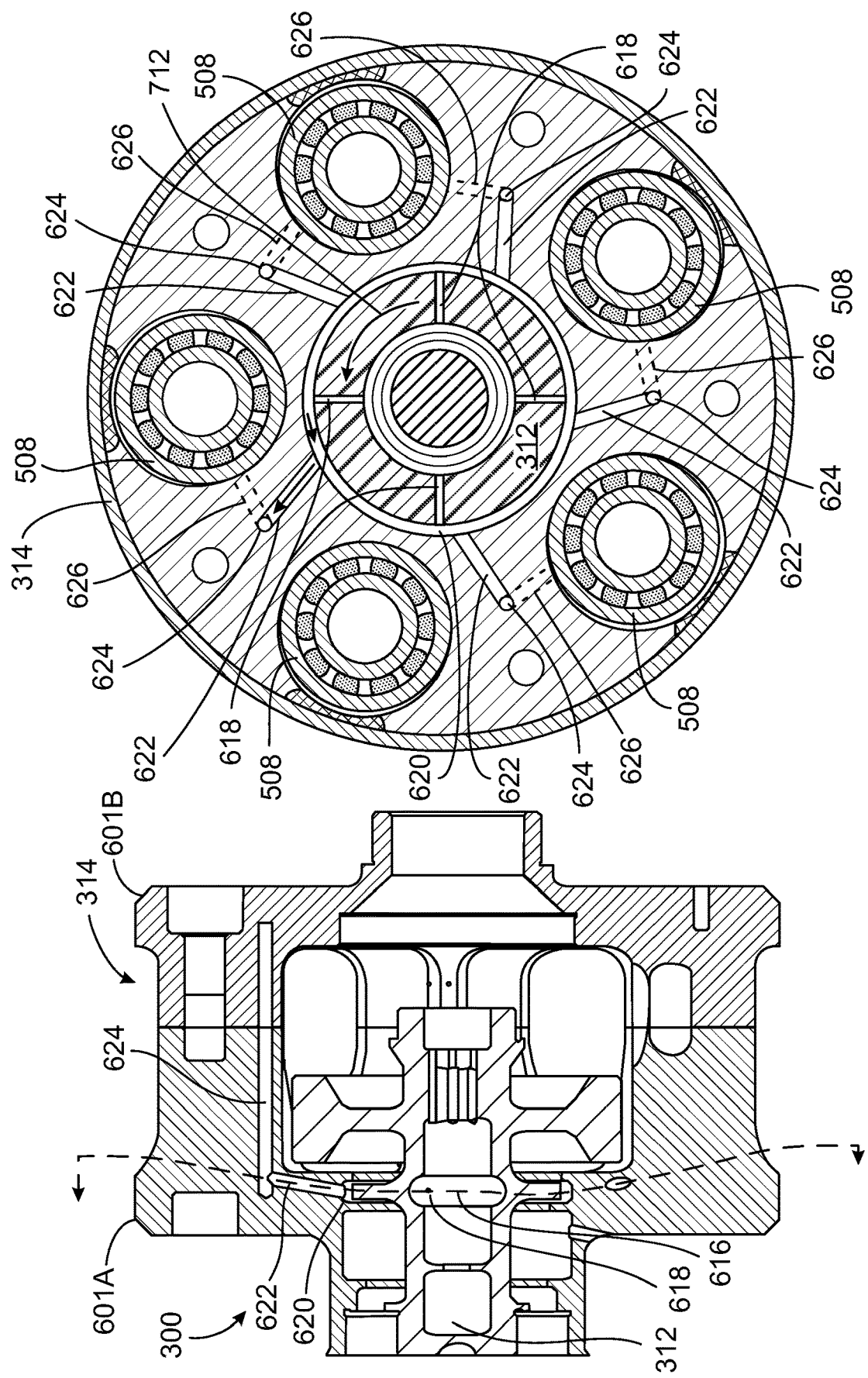

EPICYCLIC GEAR CARRIER ASSEMBLY HAVING AN INTEGRATED LUBRICATION PUMP

FIELD OF THE DISCLOSURE

This disclosure relates generally to gearboxes and, more particularly, to an epicyclic gear carrier assembly having an integrated lubrication pump.

BACKGROUND

Commercial aircraft include one or more lubrication systems to provide lubricant to aircraft engines. In particular, commercial aircraft often employ lubrication pumps to circulate lubricant to moving and/or stationary parts (e.g., gears, bearings, transmissions, etc.) of the aircraft engines.

SUMMARY

A transmission comprising a lubricant feed passageway to receive lubricant, an input shaft having a cavity that defines a shaft collection trough to receive the lubricant from the lubricant feed passageway, the input shaft defining a radial passageway to enable the lubricant to flow from the shaft collection trough to an exterior surface of the input shaft, and a carrier to receive at least a portion of the input shaft, the carrier defining a carrier collection trough and channels formed in the carrier to distribute the lubricant to at least one of rotating components or non-rotating components in the carrier, the carrier collection trough to receive the lubricant from the shaft collection trough via the radial passageway in response to the input shaft rotating.

A transmission comprising a carrier having a first body and a second body coupled to the first body to define a cavity between a carrier input and a carrier output, the carrier input defining a collection trough to collect lubricant from an input shaft to be received by the carrier input, and the carrier having channels formed in at least one of the first body or the second body to distribute the lubricant to at least one of a rotating component or a non-rotating component positioned in the cavity of the carrier.

A transmission comprising an input shaft having an interior cavity to receive lubricant, the input shaft having an aperture to enable fluid communication between the interior cavity and an external surface of the input shaft, a sun gear coupled to the input shaft, a planetary gear radially spaced from and enmeshed with the sun gear, a bearing proximate the planetary gear, and a carrier to house at least a portion of the input shaft, the sun gear, the planetary gear, and the bearing, the carrier having a channel in fluid communication with the aperture of the input shaft, the channel fluidly coupled to at least one of the planetary gear or the bearing, the channel to receive the lubricant from the interior cavity of the input shaft via the aperture and distribute the lubricant to the at least one of the planetary gear or the bearing in response to rotation of the input shaft.

BRIEF DESCRIPTION OF THE DRAWINGS

FIG. 7A is a side cross-sectional view of the example epicyclic gear system of FIGS. 1-6C, but shown without certain components for clarity.

FIG. 7B is a front cross-sectional view of the example epicyclic gear system of FIGS. 6A, 6B, 6C, and 7A.

Figure 1:
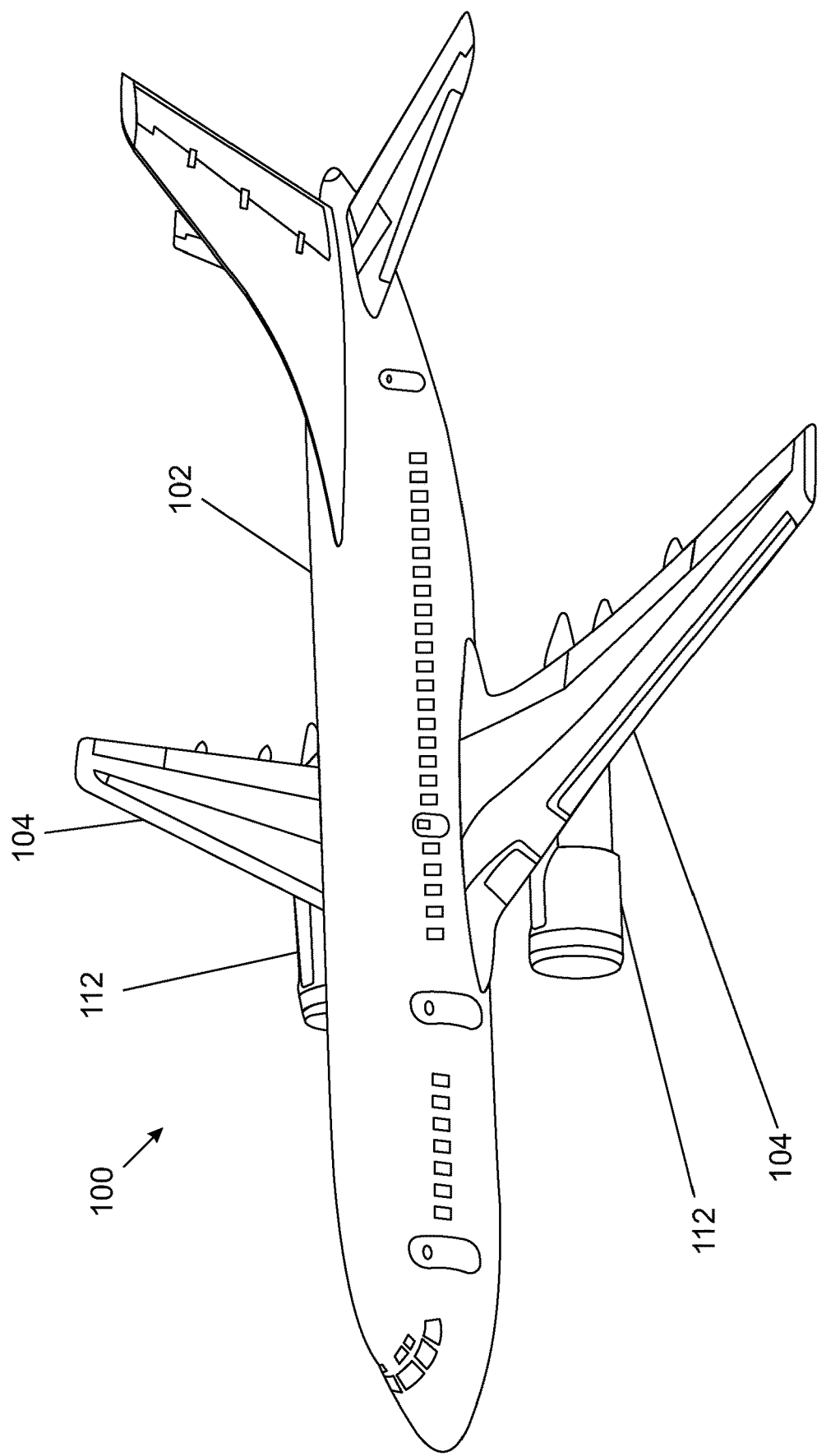
FIG. 1 is an example aircraft in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part if the second part has at least one part between Earth and the first part. Likewise, as used herein, a first part is below a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Example epicyclic gear systems are disclosed herein. Aircraft engines employ lubricant (e.g., oil) to reduce friction and/or cool moving and/or stationary components, thereby extending an operating life of the aircraft engine. For example, aircraft engines employ transmissions that receive lubricant during operation. Some transmissions (e.g., gearboxes) employ epicyclic gears that operate with a planetary gear carrier in both rotating and fixed modes. In these transmissions, the distribution of lubricant to elements within the carrier or housing of the epicyclic gear system can be difficult.

Typically, for example, epicyclic gear systems include lubrication pump(s) to transport lubricant to various components (e.g., a sun gear, planetary gears, etc.) within the carrier. In some examples, carriers that house planetary gears of the epicyclic gear systems employ seals to maintain pressure to effectively transfer lubricant from a transmission housing to the carrier. In such examples, the addition of seals in the carrier and the need to control the flow of lubricant to the seal transfer locations can add complexity to the epicyclic gear system, add frictional losses to the epicyclic gear system, and/or reduce the reliability of the epicyclic gear system.

Alternative solutions for distributing the lubricant to components within the carrier include spraying the lubricant on external surfaces of the carrier proximate the components that require lubrication. However, spraying an external surface of the carrier may not be reliable because lubricant cannot reach (e.g., or may intermittingly reach) target or desired areas given that the carrier rotates and/or a spray nozzle spraying lubricant can become misaligned with intended targets. For example, when the carrier is fixed and the spray nozzle becomes misaligned, intended targets for application of lubricant may be missed. Furthermore, adding additional spray jets to overcome this problem requires additional lubricant capacity, increased manufacturing complexity and costs.

Example epicyclic gear systems disclosed herein include an integral lubrication pumping system that provides lubrication to components (e.g., gear(s) and/or bearing(s)) located within a compound epicyclic gear carrier. Specifically, example epicyclic gear systems disclosed herein distribute lubrication to internal components of epicyclic gear systems without use of jets externally and/or internally positioned relative to the carrier and/or external pumps. In particular, example epicyclic gear systems disclosed herein receive lubrication in one or more cavities or channels formed inside the epicyclic gear systems (e.g., a carrier assembly) and employ centrifugal forces generated during rotational operation of certain components of the epicyclic gear system to distribute the lubrication to various components (e.g., planetary gears, bearings, a sun gear, etc.) positioned within the carrier (e.g., enclosed or encased within a housing of the carrier). Examples disclosed herein transport lubricant to the components within the carrier during all epicyclic operating modes, whether the carrier is fixed (e.g., via a clutch) or rotating.

To transport lubrication internally to various components (e.g., a sun/planetary gear interface, a planetary gear/carrier interface, bearings, etc.) of the epicyclic gear system, epicyclic gear systems disclosed herein employ a network of features (e.g., channels, passageways, openings, etc.) formed (e.g., integrally formed) in a carrier (e.g., a planetary gear housing) and/or an input shaft (e.g., a sun gear shaft) that are configured to distribute and/or carry lubricant to various components within the carrier. For example, an input shaft of the epicyclic gear systems disclosed herein defines an internal cavity that receives lubricant from a lubricant supply source. Centrifugal forces generated during rotation of the input shaft and other components in the system, which may or may not be rotating, causes the lubrication in the cavity to flow through passageways formed within the carrier. The example features formed in the carrier and/or the input shaft are structured to create a pressure for transporting (e.g., pushing) the lubricant to desired locations (e.g., gear interfaces and/or bearings) within the carrier. In examples disclosed herein, pressure is achieved or generated through a combination of fluid viscosity and momentum (angular and radial) of the lubricant (e.g., oil) as the lubricant exits a cavity of the input shaft via orifices and is pulled along circumferentially in one or more trough areas between an interior surface of the carrier and an exterior surface of the input shaft. Examples disclosed herein include an interface between the input shaft and the carrier trough to provide an area for the lubricant exiting the input shaft to transfer momentum to the lubricant in the carrier trough area. In examples disclosed herein, the momentum can also transfer from the rotating input shaft to the lubricant through viscosity of the lubricant. In examples disclosed herein, momentum transferred from the input shaft to the lubricant in the carrier trough area provides centrifugal pressure to transport the lubricant radially outward through channels/passageways included or formed in the carrier (e.g., a housing of the carrier).

In examples disclosed herein, one or more passageways included in the carrier (e.g., a carrier housing) provide, channel or distribute lubricant (oil) to bearings, planetary and sun gears mounted in or carried by the carrier. In examples disclosed herein, passageways are included in the carrier to ensure that the passageways remain in the correct positions to provide lubrication in cases where the carrier is fixed or rotating. Examples disclosed herein may include additional features in the trough area to augment the flow of the lubricant in the carrier such as, for example, a modified trough contour on the carrier and/or impeller features added to the surface of the input shaft.

FIG. 1 illustrates an example aircraft 100 in which examples disclosed herein can be implemented. In the illustrated example of FIG. 1, the aircraft 100 is a commercial (e.g., passenger) aircraft that includes a fuselage 102, wings 104, and engines 112 supported by the wings 104. The engines 112 provide lubricant to moving components (e.g., transmissions, gears, etc.) located within the engine 112 to reduce friction and/or overheating of the components and increase an operational lifespan of the components.

While the aircraft 100 shown in the example of FIG. 1 is implemented as a commercial aircraft, examples disclosed herein can be applied to any other aircraft (e.g., unmanned aircraft), military aircraft and/or any other vehicle (e.g., a watercraft, a ground-based vehicle, a submersible, etc.). Additionally, the example epicyclic gear systems disclosed herein can be employed with any transmission system, gearbox, and/or other rotatable housing that employs lubricant. For example, example epicyclic gear systems disclosed herein can be used with machinery (e.g., manufacturing presses or other machinery) and/or other equipment and/or machinery.

Figure 2:
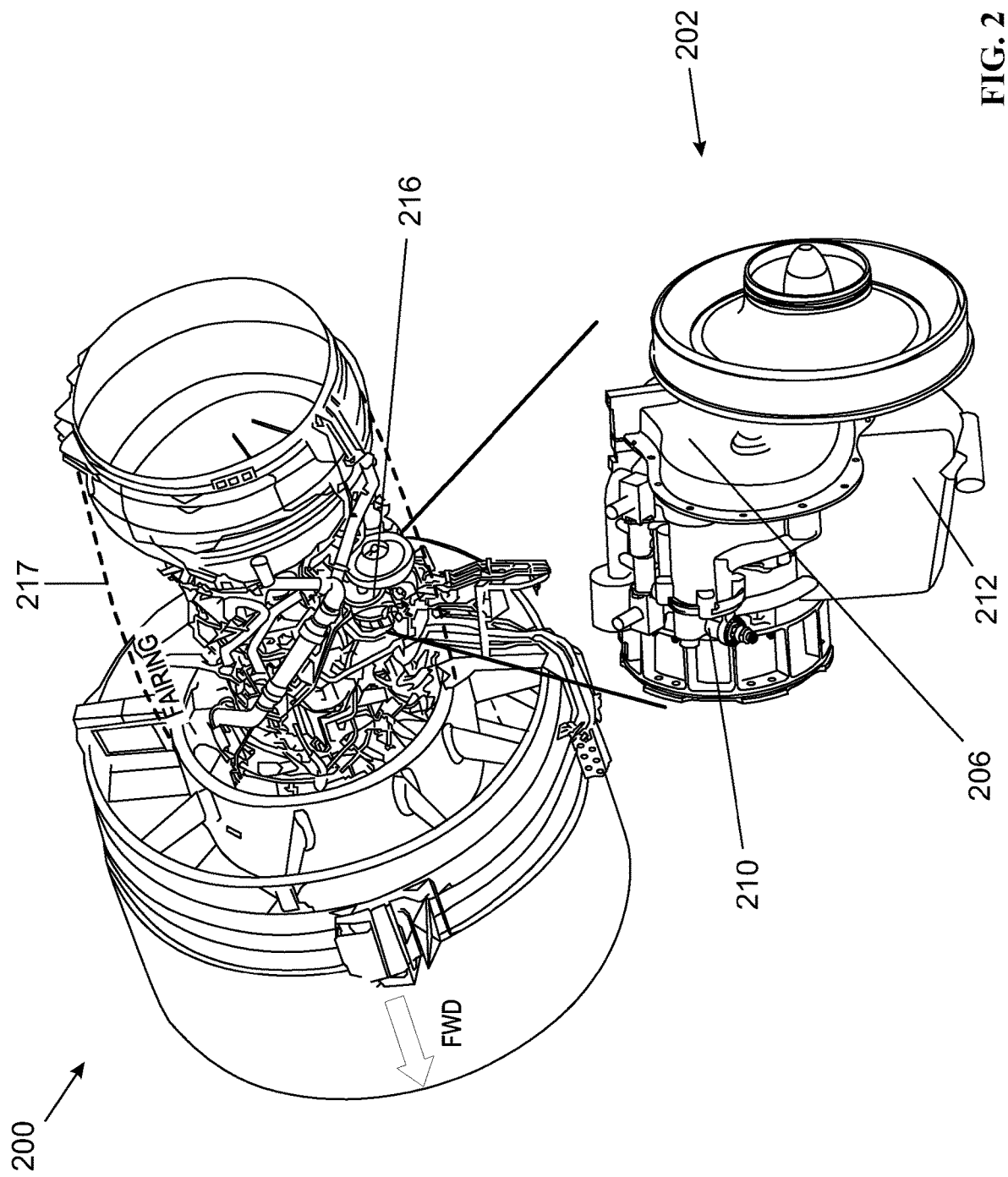
FIG. 2 illustrates an example aircraft engine having an example compressor in accordance with teachings of this disclosure.

FIG. 2 illustrates an example aircraft engine 200 that can implement the example engines 112 of FIG. 1. The example aircraft engine 200 has an example compressor 202 in accordance with teachings of this disclosure. The example compressor 202 includes a gearbox 206, a filter 210, and a lubricant reservoir 212. In some examples, the compressor 202 and/or the gearbox 206 are part of a compressor assembly 216 disposed within a fairing 217. In examples disclosed herein, the compressor 202 can be implemented as a shaft-driven compressor or any appropriate compressor type. The example lubricant reservoir 212 stores and/or contains lubricant to be provided to the gearbox 206. In this example, the lubricant reduces friction and/or wear of components of the gearbox 206.

Figure 3:
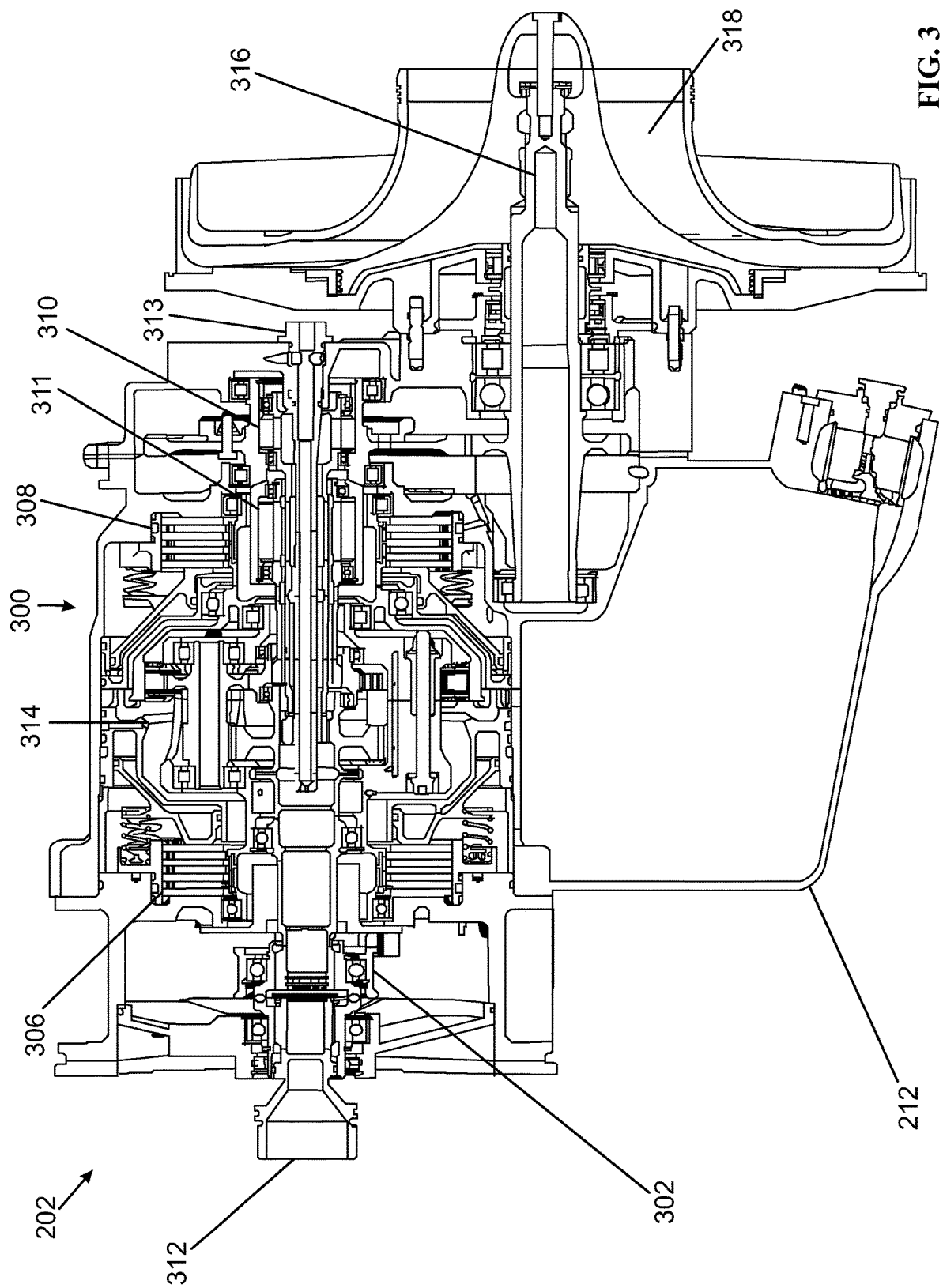
FIG. 3 is a cross-sectional side view of the example compressor shown in FIG. 2.

FIG. 3 is a cross-sectional view of the example compressor 202 of FIG. 2 including an example epicyclic gear system 300 disclosed herein. The compressor 202 of the illustrated example includes the lubricant reservoir 212, a disconnect 302, a carrier clutch 306, a ring gear clutch 308, first and second sprag clutches 310 and 311, an input shaft 312 (e.g., an engine quill shaft), a lubricant delivery passageway 313 (e.g., a lubricant delivery tube), a carrier 314, an output shaft 316, and a compressor air passage 318.

To disconnect and/or decouple the engine 200 from the compressor 202 (e.g., in the event the aircraft 100 is not operating within specified parameters), the compressor 202 of the illustrated example employs the disconnect 302. For example, the disconnect 302 can act as a clutch to operatively engage and/or operatively disengage the compressor 202 and the engine 200. In some examples, the disconnect 302 can be operated and/or controlled based on a condition (e.g., an environmental condition within the fuselage 102).

To control and/or set a gear ratio of the gearbox 206, the compressor 202 of the illustrated example employs the first sprag clutch 310, the second sprag clutch 311, the carrier clutch 306, and the ring gear clutch 308. Particularly, respective ones of the first sprag clutch 310, the second sprag clutch 311, the carrier clutch 306, and the ring gear clutch 308 can be operated between an engaged position and a disengaged position to control and/or adjust (e.g., increase or decrease) a gear ratio during operation of the gearbox 206. In other words, a combination of engagement/disengagement states of the sprag clutches 310 and 311, the carrier clutch 306, and the ring gear clutch 308 is controlled to set or adjust the gear ratio. In this example, the gear ratio is set and/or controlled based on the operating condition of the aircraft 100. The operating condition can include, but is not limited to, takeoff, cruise, landing, etc. Further, each of the operating conditions can be associated with a respective rotational speed of the input shaft 312.

To move the gearbox 206 in a set gear ratio for different conditions of the aircraft 100, the input shaft 312 and/or the carrier 314 are rotated at different speeds corresponding to the gear ratio. As a result, the epicyclic gear system 300 experiences different forces caused by the rotation of the input shaft 312 and/or the carrier 314. The epicyclic gear system 300 is described in greater detail below in connection with FIG. 5.

Figure 4:
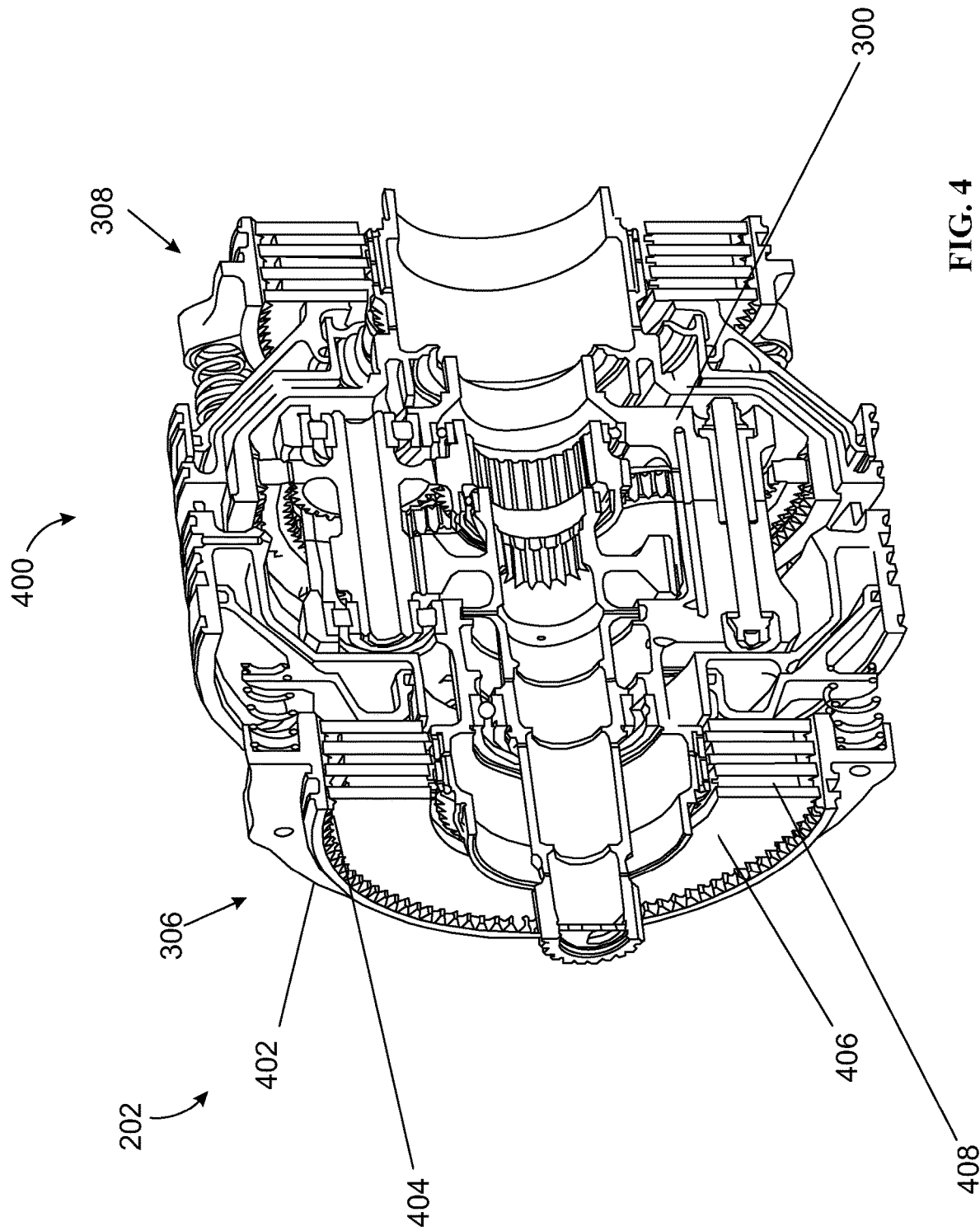
FIG. 4 is a perspective cross-sectional view of a portion of the example compressor shown in FIGS. 2 and 3, including an example epicyclic gear system in accordance with teachings disclosed herein.

FIG. 4 is a perspective cross-sectional view of a portion 400 of the example compressor 202 shown in FIGS. 2 and 3 including the epicyclic gear system 300. In the illustrated example, the carrier clutch 306 and the ring gear clutch 308 are shown. The example carrier clutch 306 includes a carrier reaction plate fitting 402, carrier reaction plate splines 404, carrier reaction plates 406, and carrier friction plates 408.

In operation, to enable engagement of the carrier clutch 306, the carrier clutch 306 includes the carrier friction plates 408 and the carrier reaction plates 406. In particular, the carrier reaction plates 406 and the carrier friction plates 408 exhibit a generally ring-like shape. In turn, to operatively couple the example carrier reaction plates 406 to the carrier reaction plate fitting 402, the example carrier reaction plates 406 include the carrier reaction plate splines 404 at their respective outer radii. In some examples, the carrier clutch 306 is moved and/or controlled by pressurized lubricant, for example.

Figure 5:
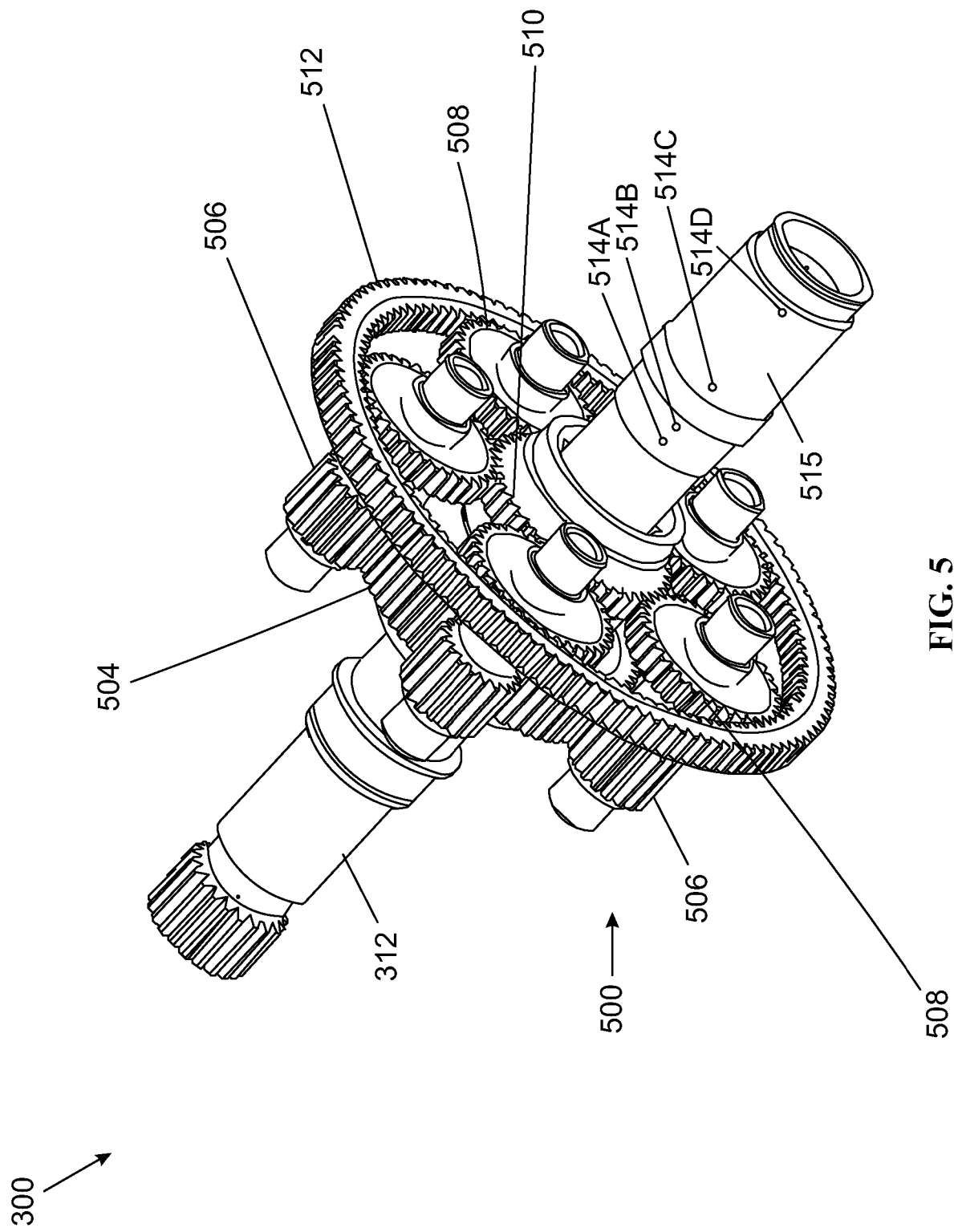
FIG. 5 is a perspective view of an example epicyclic gear system of FIG. 4 shown without a carrier housing.

FIG. 5 is a perspective view of the example epicyclic gear system 300 of FIGS. 1-4. The carrier 314, which has been omitted from FIG. 5 for clarity, houses a planetary gear system 500. In the illustrated example, the planetary gear system 500 includes a first stage sun gear 504, first stage planetary gears 506, second stage planetary gears 508, a second stage sun gear 510, and a ring gear 512. In operation, the epicyclic gear system 300 couples the input shaft 312 and the output shaft 316 of the compressor 202 (FIGS. 2 and 3), thereby increasing the speed of the output shaft 316 relative to the input shaft 312. In some examples, the input shaft 312 and the first stage sun gear 504 rotate the first stage planetary gears 506, which, in turn, rotate the carrier 314. However, in some examples, the carrier 314 is stationary and the input shaft 312 rotates the first stage sun gear 504, which, in turn, causes rotation of the first stage planetary gears 506. Additionally, or alternatively, the first stage planetary gears 506 may be coupled to the second stage planetary gears 508, which rotate around an interior radius of the ring gear 512.

The first stage sun gear 504 and the second stage sun gear 510 of the illustrated example are supported by the input shaft 312. In the illustrated example, to enable lubricant to exit from within the input shaft 312, the epicyclic gear system 300 includes openings 514A-D through the exterior surface of the input shaft 312. In some examples, the epicyclic gear system 300 includes the openings 514A-D at the input shaft 312 to expel lubricant from within an interior of the input shaft 312 to an external surface 515 of the input shaft 312 and, thus, to the ring gear 512 and the external surfaces of the carrier 314 proximate components (e.g., the first stage sun gear 504, the first stage planetary gears 506, the second stage planetary gears 508, and the second stage sun gear 510) within the carrier 314.

Figure 6A:
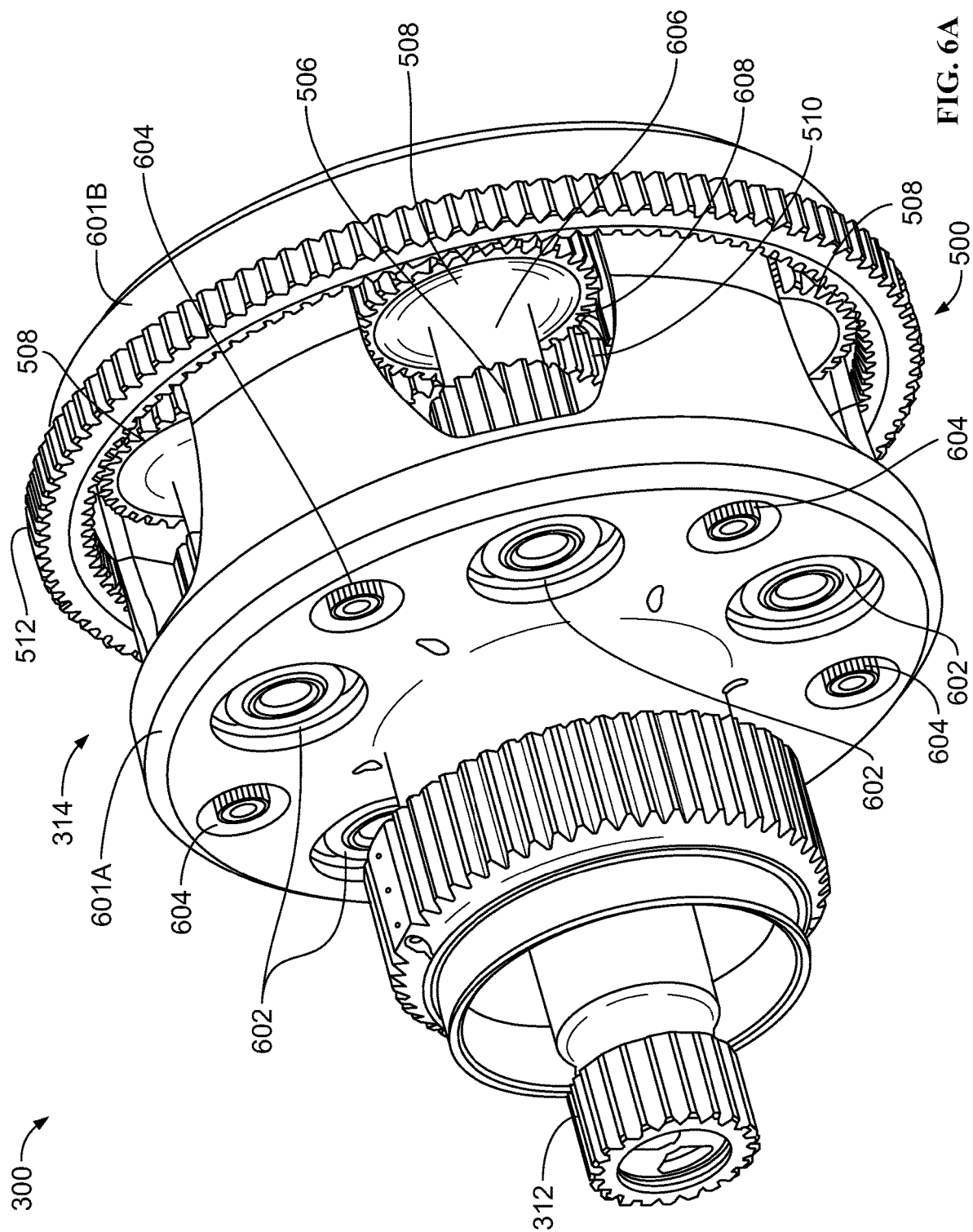
FIG. 6A is a perspective view of the example epicyclic gear system of FIGS. 1-5.

FIG. 6A is a perspective view of the example epicyclic gear system 300 of FIGS. 1-5. In the illustrated example, the second stage planetary gears 508 are radially spaced from and enmeshed with the second stage sun gear 510 at a gear interface 608 (e.g., the gear mesh 608B of FIG. 6B). The second stage sun gear 510 is operatively coupled to the input shaft 312. To support and/or facilitate rotation of the second stage planetary gears 508 relative to the carrier 314, the epicyclic gear system 300 includes bearings 602 proximate to the second stage planetary gears 508. The bearings 602 of the illustrated example are supported by the carrier 314. For example, the bearings 602 are supported on a shaft 606 of the second stage planetary gears 508 and engage the carrier 314.

In the illustrated example, the carrier 314 includes a first housing 601A (e.g., a first carrier half, a carrier input, etc.) and a second housing 601B (e.g., a second carrier half, a carrier output, etc.), where the second housing 601B is coupled to the first housing 601A (e.g., via fasteners 604). The first housing 601A and the second housing 601B define a cavity when the first housing 601A is coupled to the second housing 601B. Specifically, the first housing 601A and the second housing 601B support gears (e.g., the first stage sun gear 504, the first stage planetary gears 506, the second stage planetary gears 508, the second stage sun gear 510, and the ring gear 512) and the bearings 602. For example, the first housing 601A and the second housing 601B include opposing apertures (e.g., aligned apertures) to receive respective ends of the respective ones of planetary gear shafts of the planetary gears. In some examples, the carrier 314 and the ring gear 512 can be rotating or non-rotating. For example, the carrier 314 and the ring gear 512 are non-rotating when they are engaged with the carrier clutch 306 and the ring gear clutch 308, respectively, to stop rotating. In some examples, the bearings on the carrier 314 and the ring gear 512 can also be rotating or non-rotating components.

Figure 6B:
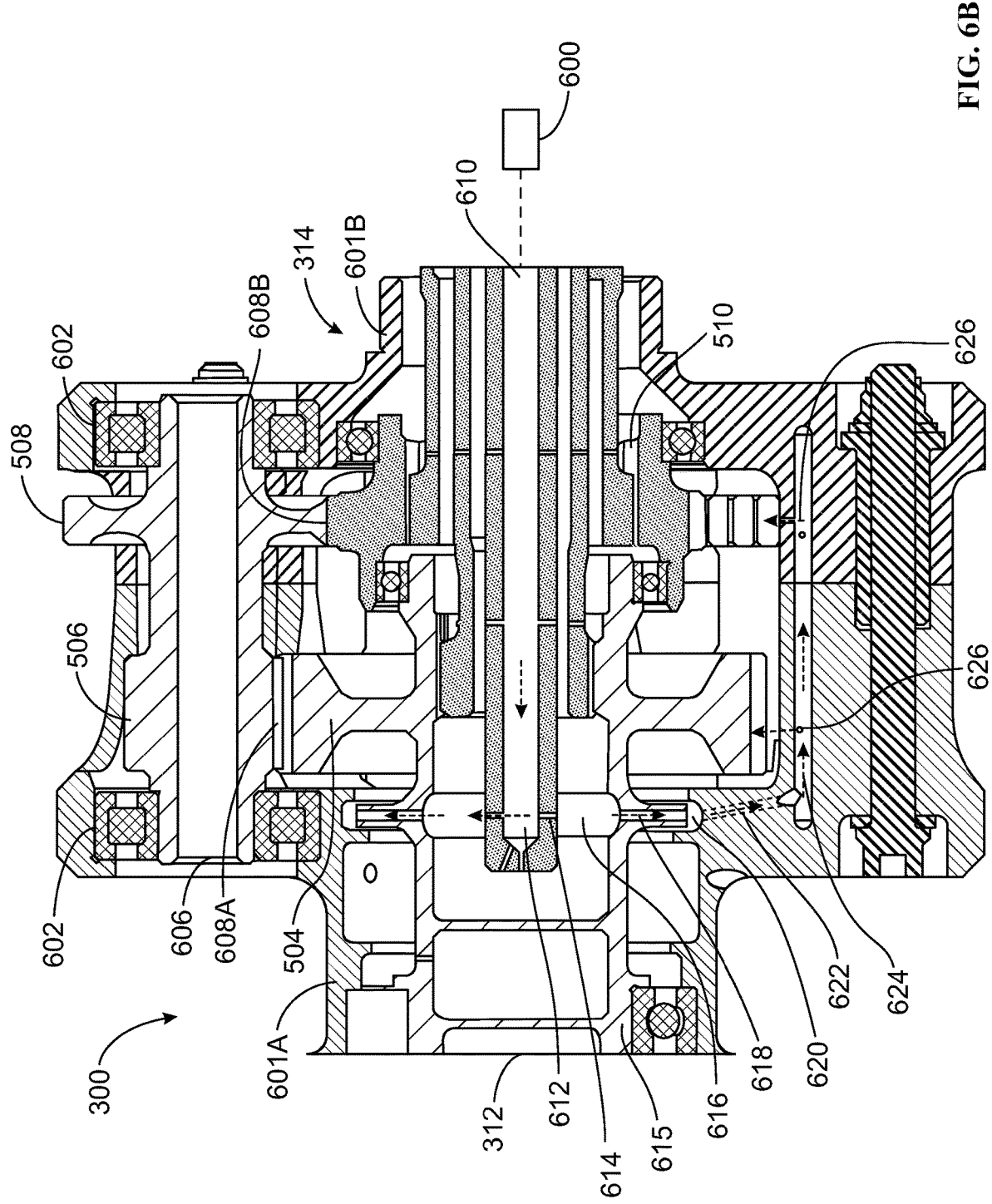
FIG. 6B is a side cross-sectional view of the example epicyclic gear system of FIG. 6A.

FIG. 6B is a side cross-sectional view of the example epicyclic gear system 300 of FIG. 6A. In the illustrated example, the epicyclic gear system 300 is coupled to an example lubrication pump 600 of the compressor 202 of FIG. 3. In examples disclosed herein, the lubrication pump 600 distributes lubricant to the epicyclic gear system 300 (e.g., the first stage sun gear 504, the first stage planetary gears 506, the second stage planetary gears 508, the second stage sun gear 510, the bearing 602 supported on the shaft 606, etc.). A lubricant feed passage 610 obtains lubricant for the epicyclic gear system 300 from a supply system/reservoir (e.g., the lubricant reservoir 212 of FIG. 2). In the epicyclic gear system 300, the first stage sun gear 504, the first stage planetary gears 506, the second stage planetary gears 508, the second stage sun gear 510, the bearings 602, and the gear meshes 608A, 608B need lubrication to prevent overheating and damage from friction during operation. The input shaft 312 includes a lubrication post 612 to receive lubricant from a supply source (via the lubricant feed passage 610). The input shaft lubrication post 612 also includes an aperture 614 to enable fluid communication between the lubrication post 612 and an external surface 615 of the input shaft 312. The input shaft 312 includes a shaft collection trough 616 that is a cavity to receive the lubricant from the lubricant feed passage 610 via the aperture 614. The input shaft 312 also defines a shaft radial passageway 618 that enables the lubricant to flow from the shaft collection trough 616 to the external surface 615 of the input shaft 312. In some examples, the epicyclic gear system 300 includes multiple ones of the shaft radial passageway 618, which are shown more clearly in FIG. 7B.

In the illustrated example, the carrier 314 includes a plurality of channels (e.g., a carrier radial passageway 622, a carrier longitudinal passageway 624, and gear and bearing lubricant jet passageways 626) formed in the carrier 314 for distribution of the lubricant to the rotating components and non-rotating components of the carrier 314 in response to rotation of the input shaft 312. In some examples, the carrier 314 includes multiple ones of the channels (e.g., the carrier radial passageway 622, the carrier longitudinal passageway 624, and the gear and bearing lubricant jet passageways 626), which are shown more clearly in FIG. 7B. The carrier 314 includes a carrier collection trough 620 to receive lubricant from the shaft radial passageway 618 and provide the lubricant to the channels in the carrier 314 (e.g., the carrier radial passageway 622, the carrier longitudinal passageway 624, and the gear and bearing lubricant jet passageways 626). In the illustrated example, the channels in the carrier 314 (e.g., the carrier radial passageway 622, the carrier longitudinal passageway 624, and the gear and bearing lubricant jet passageways 626) are formed in either the body of the first housing 601A or the body of the second housing 601B.

In the illustrated example, the channels (e.g., a carrier radial passageway 622, a carrier longitudinal passageway 624, and gear and bearing lubricant jet passageways 626) define dedicated flowpaths/passageways to the first stage sun gear 504, the first stage planetary gears 506, the second stage planetary gears 508, the second stage sun gear 510, the bearings 602, and the gear meshes 608A, 608B. In some examples, the plurality of channels can be drilled or formed via molding, machining, etc., in the carrier 314. The channels (e.g., a carrier radial passageway 622, a carrier longitudinal passageway 624, and gear and bearing lubricant jet passageways 626) in the carrier 314 are in fluid communication with the aperture 614 of the lubrication post 612 via the shaft collection trough 616 and the shaft radial passageway 618. The channels in the carrier 314 (e.g., the carrier radial passageway 622, the carrier longitudinal passageway 624, and the gear and bearing lubricant jet passageways 626) are fluidly coupled to the first stage sun gear 504, the first stage planetary gears 506, the second stage planetary gears 508, the second stage sun gear 510, the bearings 602, and the gear meshes 608A, 608B.

In the illustrated example, the shaft collection trough 616 provides an area for the lubricant exiting the input shaft 312 through the aperture 614 to transfer momentum to the lubricant in the carrier collection trough 620. In examples disclosed herein, the momentum transferred from the input shaft 312 provides centrifugal pressure to transport the lubricant radially outward through the channels/passageways in the carrier (e.g., the carrier radial passageway 622, the carrier longitudinal passageway 624, and the gear and bearing lubricant jet passageways 626). The centrifugal pressure of the lubricant causes the lubricant from the input shaft 312 to expel from the shaft collection trough 616 and into the carrier collection trough 620 via the shaft radial passageway 618 in response to the input shaft 312 rotating about a longitudinal axis of the input shaft 312. In some examples, when the input shaft 312 is rotating and the carrier 314 is stationary, the speed differential between the input shaft 312 and the carrier 314 provides the centrifugal pressure to transport the lubricant to the carrier collection trough 620 and radially outward through the channels/passageways in the carrier 314. In some examples, when the input shaft 312 and the carrier 314 are both rotating (e.g., no speed differential), the centrifugal action of the rotating parts (e.g., the input shaft 312, the carrier 314, etc.) causes the lubricant to transport from the input shaft 312 to the carrier collection trough 620 and radially outward through the channels/passageways in the carrier 314 to the bearings and gears (e.g., the first stage sun gear 504, the first stage planetary gears 506, the second stage planetary gears 508, the second stage sun gear 510, the bearings 602, and the gear meshes 608A, 608B).

Figure 6C:
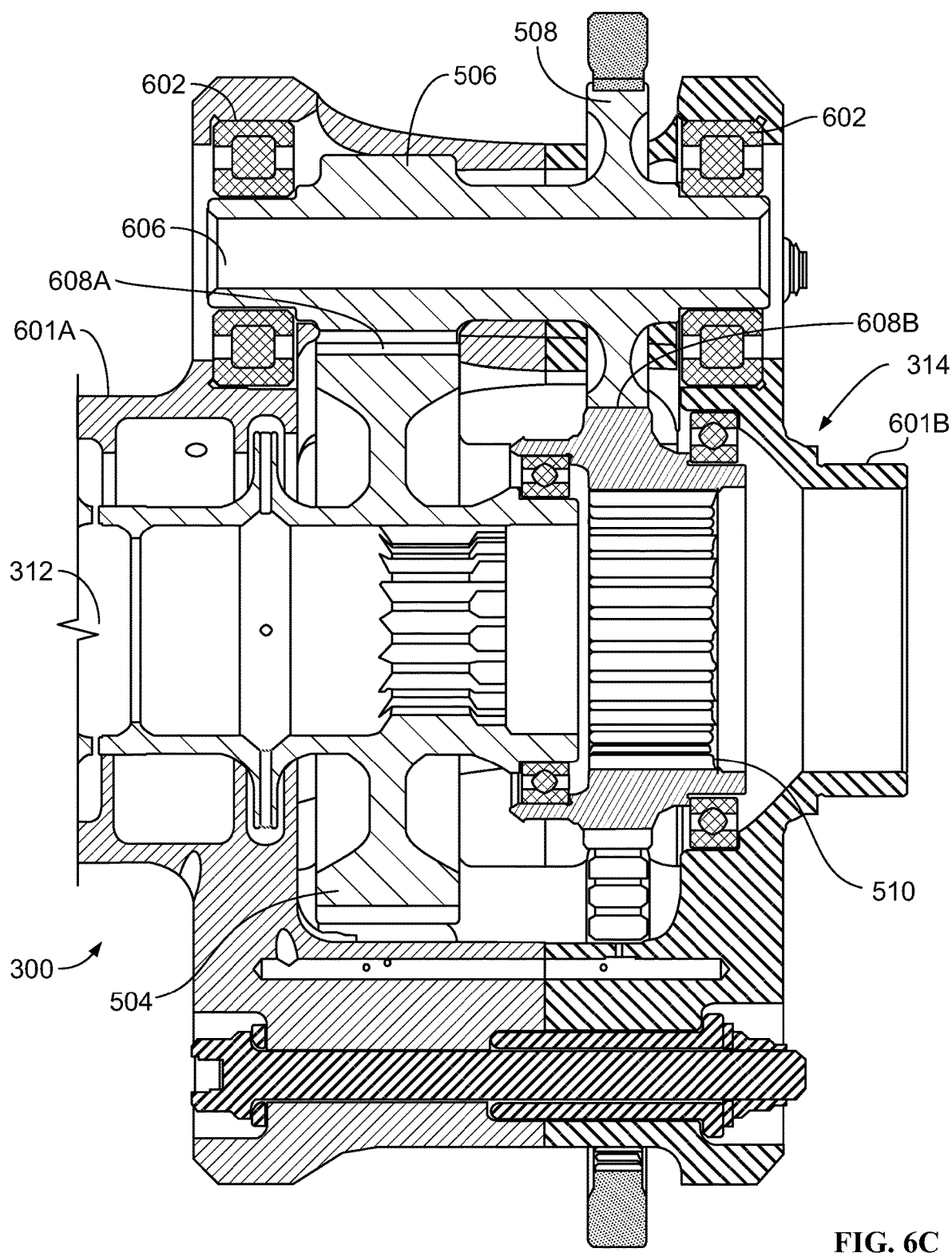
FIG. 6C is another cross-sectional side view of the example epicyclic gear system of FIGS. 6A and 6B, but shown with some components removed for clarity purposes.

In the illustrated example, the carrier collection trough 620 provides the lubricant to the carrier radial passageway 622 and the carrier longitudinal passageway 624. The centrifugal pressure of the lubricant from the shaft radial passageway 618 causes the lubricant to move through the carrier radial passageway 622 and the carrier longitudinal passageway 624. In some examples, the carrier radial passageway 622 and the carrier longitudinal passageway 624 are oriented to capture the momentum from the lubricant in the shaft collection trough 616. In the illustrated example, the carrier radial passageway 622, the carrier longitudinal passageway 624, and the gear and bearing lubricant jet passageways 626 channel the lubricant to the first stage sun gear 504, the first stage planetary gears 506, the second stage planetary gears 508, the second stage sun gear 510, the bearings 602, and the gear meshes 608A, 608B without the use of external pumps. FIG. 6C is another cross-sectional side view of the example epicyclic gear system 300 of FIGS. 6A and 6B, but shown with some components removed for clarity purposes.

FIG. 7A is a side cross-sectional view of the example epicyclic gear system 300 of FIGS. 1-6C, but shown without certain components for clarity. The epicyclic gear system 300 shown in FIG. 7A illustrates the shaft collection trough 616, the shaft radial passageway 618, the carrier collection trough 620, the carrier radial passageway 622, and the carrier longitudinal passageway 624 without the other components of the epicyclic gear system 300 (e.g., the first stage sun gear 504, the first stage planetary gears 506, the second stage planetary gears 508, the second stage sun gear 510, bearings 602, and the gear meshes 608A, 608B). In the illustrated example, the carrier radial passageway 622 is oriented to capture the momentum of the lubricant from the carrier collection trough 620. The epicyclic gear system 300 includes a close tolerance between the input shaft 312 and the carrier collection trough 620 to maximize the pressure of the lubricant in the carrier collection trough 620, which helps with the transport of the lubricant through the carrier radial passageway 622 and the carrier longitudinal passageway 624. In some examples, the epicyclic gear system 300 can include sealing features between the input shaft 312 and the carrier collection trough 620 to further maximize the pressure.

FIG. 7B is a front cross-sectional view of the example epicyclic gear system 300 of FIGS. 6A, 6B, 6C, and 7A. In the illustrated example, the input shaft 312 moves in a rotational direction 712 about a longitudinal axis of the input shaft 312. The rotational direction 712 of the input shaft 312 provides the centrifugal pressure to transport the lubricant radially out through the shaft radial passageways 618, the carrier radial passageways 622, the carrier longitudinal passageways 624, and the gear and bearing lubricant jet passageways 626. In the illustrated example, the gear and bearing lubricant jet passageways 626 supply the lubricant to the planetary gears 508.

Figure 8:
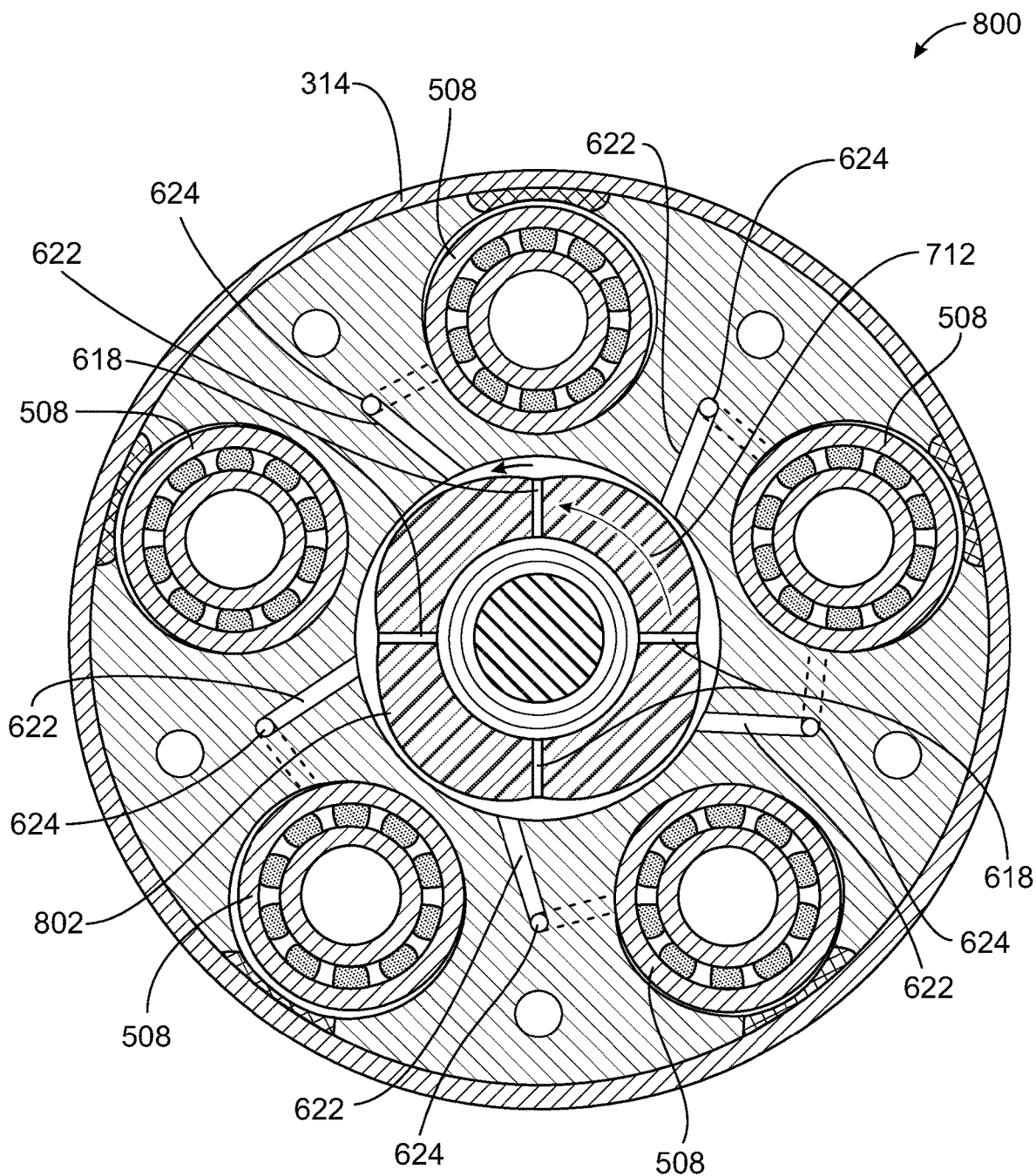
FIG. 8 is a front cross-sectional view similar to FIG. 7B, but showing another example epicyclic gear system disclosed herein.

FIG. 8 is a front cross-sectional view similar to FIG. 7B but showing another example epicyclic gear system 800 disclosed herein. The illustrated example of FIG. 8 illustrates the components of the epicyclic gear system 300 of FIG. 7B. However, the illustrated example of FIG. 8 includes a carrier collection trough 802 different from the carrier collection trough 620 of FIGS. 6B, 7A, and 7B. The carrier collection trough 802 has a scalloped shape defining a varying radius to increase pressure of the lubricant at the plurality of channels (e.g., the carrier radial passageways 622, the carrier longitudinal passageways 624, and the gear and bearing lubricant jet passageways 626). In some examples, the scalloped shape of the carrier collection trough 802 helps facilitate lubricant collection from the shaft radial passageways 618. In some examples, the scalloped shape of the carrier collection trough 802 can be drilled or formed via molding, machining, etc.

Figure 9:
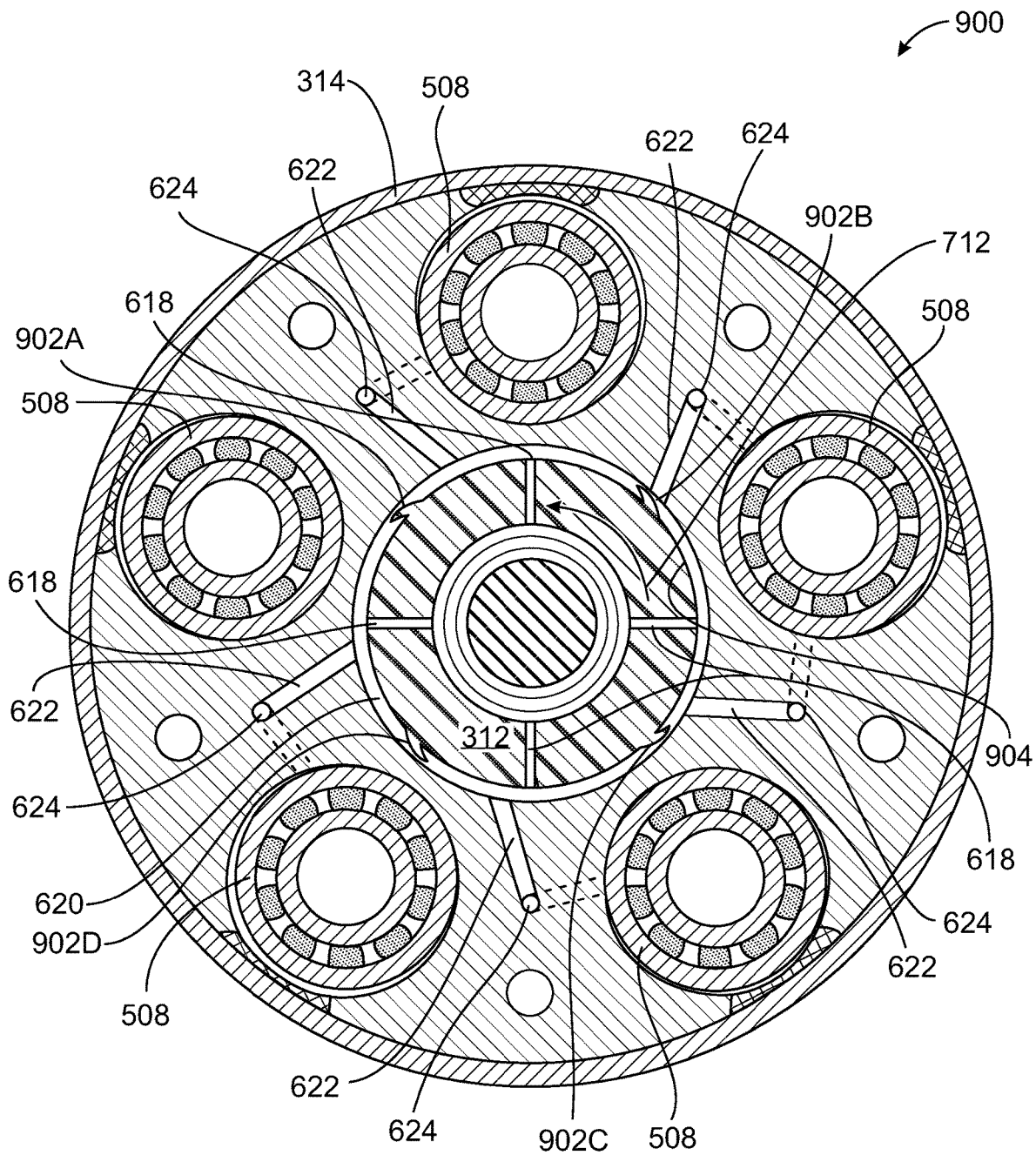
FIG. 9 is a front cross-sectional view similar to FIG. 7B, but showing another epicyclic gear system disclosed herein.

FIG. 9 is a front cross-sectional view similar to FIG. 7B but showing another epicyclic gear system 900 disclosed herein. The illustrated example of FIG. 9 illustrates the components of the epicyclic gear system 300 of FIG. 7B. However, the illustrated example of FIG. 9 further includes impellers 902A-D around the input shaft 312. In the illustrated example, an outer surface 904 of the input shaft 312 includes the plurality of impellers 902A-D to facilitate transport of the lubricant from the carrier collection trough 620 to the plurality of channels of the carrier 314 (e.g., the carrier radial passageways 622, the carrier longitudinal passageways 624, and the gear and bearing lubricant jet passageways 626). The impellers 902A-D facilitate the transport of the lubricant into the entrances of the carrier radial passageways 622 from the carrier collection trough 620. The illustrated example further includes an end plate to enclose the impellers 902A-D inside the carrier collection trough 620 to increase the pressure imparted to the lubricant to cause the lubricant to flow within the plurality of channels of the carrier 314 (e.g., the carrier radial passageways 622, the carrier longitudinal passageways 624, and the gear and bearing lubricant jet passageways 626).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that relate to an epicyclic gear carrier having an integrated lubrication pump. The example methods, apparatus and articles of manufacture provide a simple, cost effective means to provide lubricant to planet and sun gear meshes and bearings when the carrier is fixed or rotating. The example methods, apparatus and articles of manufacture minimize the quantity of parts needed to provide the lubricant to the carrier components when compared to systems that transfer lubricant to the rotating carrier from stationary housing through sealed interfaces. For example, the example methods, apparatus and articles of manufacture eliminate the need for any lubricant seals between the fixed components of the carrier, which reduces the complexity of the system while increasing reliability (e.g., fewer parts that will wear or fail) and reducing drag associated with the drive system seals. The example methods, apparatus and articles of manufacture improve the effectiveness of targeting the lubricant delivery to bearings and gears in the carrier by including lubricant passageways in the carrier housing.

Example methods, apparatus, systems, and articles of manufacture for an epicyclic gear carrier assembly having an integrated lubrication pump are disclosed herein. Further examples and combinations thereof include the following:

Example 1 includes a transmission comprising a lubricant feed passageway to receive lubricant, an input shaft having a cavity that defines a shaft collection trough to receive the lubricant from the lubricant feed passageway, the input shaft defining a radial passageway to enable the lubricant to flow from the shaft collection trough to an exterior surface of the input shaft, and a carrier to receive at least a portion of the input shaft, the carrier defining a carrier collection trough and channels formed in the carrier to distribute the lubricant to at least one of rotating components or non-rotating components in the carrier, the carrier collection trough to receive the lubricant from the shaft collection trough via the radial passageway in response to the input shaft rotating.

Example 2 includes the transmission of example 1, wherein a centrifugal pressure of the lubricant causes the lubricant to flow from the shaft collection trough to the carrier collection trough via the radial passageway, and causes the lubricant to flow through the channels of the carrier.

Example 3 includes the transmission of example 2, wherein the centrifugal pressure of the lubricant causes the lubricant to flow from the carrier collection trough to the channels of the carrier.

Example 4 includes the transmission of example 1, wherein the channels of the carrier include a carrier radial passageway, a carrier longitudinal passageway, and jet passageways.

Example 5 includes the transmission of example 4, wherein the at least one of the rotating components includes at least one of a sun gear and a planetary gear, wherein the at least one of the non-rotating components include at least one bearing, the channels formed in the carrier define dedicated passageways to at least one of the sun gear, the planetary gear or the bearing.

Example 6 includes the transmission of example 5, lubricant wherein the sun gear enmeshes with the planetary gear at a gear interface, and a respective one of the channels provides a dedicated passageway from the shaft collection trough to the gear interface.

Example 7 includes a transmission comprising a carrier having a first body and a second body coupled to the first body to define a cavity between a carrier input and a carrier output, the carrier input defining a collection trough to collect lubricant from an input shaft to be received by the carrier input, and the carrier having channels formed in at least one of the first body or the second body to distribute the lubricant to at least one of a rotating component or a non-rotating component positioned in the cavity of the carrier.

Example 8 includes the transmission of example 7, wherein the collection trough is to receive the lubricant in response to the input shaft rotating.

Example 9 includes the transmission of example 8, wherein a centrifugal pressure imparted to the lubricant in response to the input shaft rotating is to cause the lubricant to move through the channels of the carrier.

Example 10 includes the transmission of example 7, wherein the channels are formed in the at least one of the first body or the second body via molding or machining.

Example 11 includes the transmission of example 7, wherein the channels are to convey the lubricant to a sun gear, planetary gears, and bearings positioned within the cavity of the carrier.

Example 12 includes the transmission of example 7, wherein the collection trough has a scalloped shape defining a varying radius to increase pressure of the lubricant at the channels.

Example 13 includes the transmission of example 7, wherein an outer surface of the input shaft includes impellers to facilitate transport of the lubricant from the collection trough to the channels.

Example 14 includes the transmission of example 13, further including an end plate to enclose the impellers inside the collection trough to increase a pressure imparted to the lubricant to cause the lubricant to flow within the channels.

Example 15 includes a transmission comprising an input shaft having an interior cavity to receive lubricant, the input shaft having an aperture to enable fluid communication between the interior cavity and an external surface of the input shaft, a sun gear coupled to the input shaft, a planetary gear radially spaced from and enmeshed with the sun gear, a bearing proximate the planetary gear, and a carrier to house at least a portion of the input shaft, the sun gear, the planetary gear, and the bearing, the carrier having a channel in fluid communication with the aperture of the input shaft, the channel fluidly coupled to at least one of the planetary gear or the bearing, the channel to receive the lubricant from the interior cavity of the input shaft via the aperture and distribute the lubricant to the at least one of the planetary gear or the bearing in response to rotation of the input shaft.

Example 16 includes the transmission of example 15, wherein a centrifugal pressure of the lubricant is to cause the lubricant to flow from the interior cavity to the channel to distribute the lubricant to the at least one of the planetary gear or the bearing.

Example 17 includes the transmission of example 15, wherein the channel includes a carrier radial passageway, a carrier longitudinal passageway, and a jet passageway.

Example 18 includes the transmission of example 17, wherein the channel includes a carrier collection trough to receive the lubricant from the interior cavity and provide the lubricant to the carrier radial passageway, the carrier longitudinal passageway, and the jet passageway.

Example 19 includes the transmission of example 15, wherein the channel defines one or more dedicated flowpaths to at least one of the sun gear, the planetary gear or the bearing.

Example 20 includes the transmission of example 15, wherein the channel is formed in the carrier via molding or machining.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A transmission comprising:
a lubricant feed passageway to receive lubricant;
an input shaft having a shaft collection trough to receive the lubricant from the lubricant feed passageway, the input shaft defining a radial passageway to enable the lubricant to flow from the shaft collection trough to an exterior surface of the input shaft; and
a carrier to receive at least a portion of the input shaft, the carrier defining a carrier collection trough and channels formed in the carrier to distribute the lubricant to at least one of rotating components or non-rotating components in the carrier, the carrier collection trough axially aligned with the shaft collection trough, the carrier collection trough to receive the lubricant from the shaft collection trough via the radial passageway in response to the input shaft rotating, the carrier including a first housing portion removably coupled to a second housing portion, the channels of the carrier include a carrier radial passageway, a carrier longitudinal passageway, and jet passageways, the carrier longitudinal passageway extending between the first carrier housing and the second carrier housing in a direction along a longitudinal axis of the input shaft.

2. The transmission of claim 1, wherein a centrifugal pressure of the lubricant causes the lubricant to flow from the shaft collection trough to the carrier collection trough via the radial passageway, and causes the lubricant to flow through the channels of the carrier.

3. The transmission of claim 2, wherein the centrifugal pressure of the lubricant causes the lubricant to flow from the carrier collection trough to the channels of the carrier.

4. The transmission of claim 1, wherein the at least one of the rotating components includes at least one of a sun gear and a planetary gear, wherein the at least one of the non-rotating components include at least one bearing, the channels formed in the carrier define dedicated passageways to at least one of the sun gear, the planetary gear or the bearing.

5. The transmission of claim 4, wherein the sun gear enmeshes with the planetary gear at a gear interface, and a respective one of the channels provides a dedicated passageway from the shaft collection trough to the gear interface.

6. The transmission of claim 1, wherein the carrier collection trough has a scalloped shape.

7. The transmission of claim 1, further including a pump to distribute lubricant to the input shaft, the input shaft to distribute the lubricant to the carrier collection trough via centrifugal pressure as the input shaft rotates.

8. A transmission comprising:
an input shaft including a lubricant feed passageway and a shaft collection trough, the shaft collection trough to receive lubricant from the lubricant feed passageway, the input shaft having a radial passageway in fluid communication with the shaft collection trough to enable fluid communication between the shaft collection trough and an external surface of the input shaft; and
a carrier having a first body and a second body coupled to the first body to define a cavity between a carrier input and a carrier output to house a plurality of planetary gears, the carrier input defining a carrier collection trough to collect lubricant from the shaft collection trough of the input shaft, the carrier collection trough axially aligned with the shaft collection trough, the carrier having a plurality of channels formed in at least one of the first body or the second body to distribute the lubricant to the planetary gears positioned in the cavity of the carrier, respective ones of the channels to provide a dedicated flow path to respective ones of the planetary gears, wherein the collection trough is to receive the lubricant in response to a rotation of the input shaft.

9. The transmission of claim 8, wherein a centrifugal pressure is imparted to the lubricant in response to the input shaft rotating is to cause the lubricant to move through the channels of the carrier.

10. The transmission of claim 8, wherein the channels are formed in the at least one of the first body or the second body via molding or machining.

11. The transmission of claim 8, wherein the channels are to convey the lubricant to a sun gear, planetary gears, and bearings positioned within the cavity of the carrier.

12. The transmission of claim 8, wherein the carrier collection trough has a scalloped shape defining a varying radius to increase pressure of the lubricant at the channels.

13. A transmission comprising:
an input shaft, an outer surface of the input shaft having impellers; and
a carrier having a first body and a second body coupled to the first body to define a cavity between a carrier input and a carrier output, the carrier input to receive the input shaft, the carrier input defining a collection trough to collect lubricant from the input shaft, the carrier having channels formed in at least one of the first body or the second body to distribute the lubricant to at least one of a rotating component or a non-rotating component positioned in the cavity of the carrier, the impellers of the input shaft to cause transport of the lubricant from the collection trough to the channels.

14. The transmission of claim 13, further including an end plate to enclose the impellers inside the collection trough to increase a pressure imparted to the lubricant to cause the lubricant to flow within the channels.

15. The transmission of claim 13, wherein the channels are formed in the at least one of the first body or the second body via molding or machining.

16. The transmission of claim 13, wherein the channels are to convey the lubricant to a sun gear, planetary gears, and bearings positioned within the cavity of the carrier.

17. The transmission of claim 13, wherein the collection trough has a scalloped shape defining a varying radius to increase pressure of the lubricant at the channels.

18. A transmission comprising:
an input shaft having an interior cavity and a shaft collection trough to receive lubricant, the input shaft having an aperture in fluid communication with the shaft collection trough to enable fluid communication between the interior cavity and an external surface of the input shaft;
a sun gear coupled to the input shaft;
a planetary gear radially spaced from and enmeshed with the sun gear;
a bearing proximate the planetary gear; and
a carrier to house at least a portion of the input shaft, the sun gear, the planetary gear, and the bearing, the carrier having a carrier trough and a channel formed in a surface of the carrier, the carrier trough to axially align with the input shaft trough, the carrier trough being in fluid communication with the aperture of the input shaft, the carrier trough in fluid communication with the channel, the channel fluidly coupled to at least one of the planetary gear or the bearing, the channel to receive the lubricant from the interior cavity of the input shaft via the aperture and distribute the lubricant to the at least one of the planetary gear or the bearing in response to rotation of the input shaft.

19. The transmission of claim 18, wherein a centrifugal pressure of the lubricant is to cause the lubricant to flow from the interior cavity to the channel to distribute the lubricant to the at least one of the planetary gear or the bearing.

20. The transmission of claim 18, wherein the channel includes a carrier radial passageway, a carrier longitudinal passageway, and a jet passageway.

21. The transmission of claim 20, wherein the channel includes a carrier collection trough to receive the lubricant from the interior cavity and provide the lubricant to the carrier radial passageway, the carrier longitudinal passageway, and the jet passageway.

22. The transmission of claim 18, wherein the channel defines one or more dedicated flowpaths to at least one of the sun gear, the planetary gear or the bearing.

23. The transmission of claim 18, wherein the channel is formed in the carrier via molding or machining.

24. The transmission of claim 18, wherein the shaft collection trough and the carrier collection trough are coaxially aligned.

25. The transmission of claim 18, wherein the shaft collection trough provides an area for lubricant exiting the input shaft trough through the aperture to transfer momentum to lubricant in the carrier collection trough.

* * * * *